United States Patent [19]
Fujiwara

[11] Patent Number: 6,131,708
[45] Date of Patent: Oct. 17, 2000

[54] DRUM BRAKE DEVICE

[75] Inventor: Yoichi Fujiwara, Nagoya, Japan

[73] Assignee: Nisshinbo Industries Inc., Tokyo, Japan

[21] Appl. No.: 09/167,558

[22] Filed: Oct. 7, 1998

[30] Foreign Application Priority Data

Oct. 13, 1997 [JP] Japan .................................. 9-294879

[51] Int. Cl.⁷ ............................ F16D 51/24; F16D 65/09
[52] U.S. Cl. ................ 188/250 E; 188/328; 188/205 A; 188/206 A; 188/341
[58] Field of Search ........................... 188/250 E, 250 F, 188/250 A, 250 G, 205 A, 206 A, 106 F, 327, 328, 329, 340, 341, 79.64, 79.56, 79.51, 79.54, 334, 335, 206 R, 205 R

[56] References Cited

U.S. PATENT DOCUMENTS

| | | | |
|---|---|---|---|
| 2,347,219 | 4/1944 | Schnell | 188/327 |
| 3,283,858 | 11/1966 | Mossey et al. | 188/341 |
| 3,575,266 | 4/1971 | Sitchin . | |
| 4,216,850 | 8/1980 | Kizaki | 188/341 |
| 4,296,845 | 10/1981 | Roberts | 188/328 |
| 4,364,456 | 12/1982 | Colpaert . | |
| 4,387,792 | 6/1983 | Imamura . | |
| 4,467,897 | 8/1984 | Kubo et al. . | |
| 4,987,979 | 1/1991 | Wicks | 188/250 E |
| 5,099,967 | 3/1992 | Lang | 188/250 F |
| 5,275,260 | 1/1994 | Evans et al. . | |
| 5,360,086 | 11/1994 | Charmat . | |
| 5,553,691 | 9/1996 | Mery et al. | 188/106 F |

FOREIGN PATENT DOCUMENTS

| | | |
|---|---|---|
| 0331532 | 9/1989 | European Pat. Off. ............. 188/327 |
| 0 353 857 | 2/1990 | European Pat. Off. . |
| 0 836 028 | 4/1998 | European Pat. Off. . |
| 1198947 | 2/1958 | France ................................ 188/329 |
| 1 497 559 | 1/1968 | France . |
| 2697600 | 5/1994 | France . |
| 2194300 | 3/1988 | United Kingdom . |

*Primary Examiner*—Douglas C. Butler
*Attorney, Agent, or Firm*—Arent Fox Kintner Plotkin & Kahn, PLLC

[57] ABSTRACT

A shock absorber (13) is provided between the anchor (9) and the ends (2b, 3b) of the brake shoes (2, 3) facing the anchor (9) to reduce the impact noise between the brake shoe and the anchor.

18 Claims, 9 Drawing Sheets

DRUM BRAKE DEVICE

BACKGROUND OF INVENTION

This invention relates to a drum brake device that functions as a leading-trailing (LT) type when the service brake is applied, and as a duo-servo (DS) type when the parking brake is applied. More specifically, it relates to a drum brake device in which the configuration effectively reduces the noise created when just releasing the parking brake.

This type of drum brake device has been disclosed, for example, in U.S. Pat. No. 5,275,260 and in Japanese Official Gazette No. 62-8652.

Its configuration will be explained with reference to FIG. 10 and FIG. 11. A wheel cylinder b and an anchor block c are set on the upper and lower segments respectively of a back plate a. The upper and lower ends of a pair of left and right brake shoes d, e are functionally engaged with the wheel cylinder b and the anchor block c, respectively.

Shoe return springs f, g are stretched between the upper and lower ends of the brake shoes d, e respectively. A parking lever h is pivoted on the lower segment of the left brake shoe d. A pivot lever i is pivoted such that its central segment can rotates on the central segment of the right brake shoe e. A rod j is mounted horizontally between the brake shoes d, e in the vicinity of the anchor block c. The left end of the rod j is engaged with the brake shoe d and the parking lever h, and the right end of the rod j is engaged with the brake shoe e and the lower segment of the pivot lever i, respectively.

On the wheel cylinder b side of the device, a screw-type shoe clearance adjustment device k is mounted horizontally between the brake shoes d, e. The left end of the shoe clearance adjustment device k is engaged with the brake shoe d, and the right end is engaged with the brake shoe e and the upper segment of the pivot lever i.

The above-explained drum brake device functions as a LT type brake by frictionally engaging with the brake drum n since both brake shoes d, e open with the point of abutment against the anchor block c as the fulcrum by operating the wheel cylinder b when the service brake is applied.

When the parking brake is applied, the rotational force of the parking lever h is transferred in sequence to the rod j, the pivot lever i, and the shoe clearance adjustment device k, whereupon the left shoe d opens, with its point of abutment with the anchor block c as the fulcrum, and frictionally engages with the brake drum n. Then, the pivot lever i opens, with its point of abutment with the shoe clearance adjustment device k as the fulcrum, whereupon the right brake shoe e, on which the pivot lever i is pivoted, opens simultaneously to frictionally engage with the brake drum n. Also, as in FIG. 11, the reaction force of the parking lever h effects on the lower left end of the brake shoe d.

As is shown in FIG. 11, at this point, should the vehicle be stopped on an incline or decline, and rotational force is applied on the brake drum n in the direction of arrow R, the friction force of the right brake shoe e is transferred via the shoe clearance adjustment device k as a force to extend the left brake shoe d. Should the force be applied in the opposite direction on the brake drum n, the friction force of the left brake shoe d is transferred via the shoe clearance adjustment device k to the right brake shoe e. As such, when the parking brake is applied, this drum brake device functions as a DS type brake.

When applying the parking brake on a level road, the right brake shoe e with the pivot lever i is separated from the anchor block c. If the parking brake is released under this condition, the right brake shoe e hits the anchor block c to create a noise, which gives an unsecure and uncomfortable feeling to the driver.

When the service brake is applied to stop on a slope and is released while the vehicle is stopping, the impact noise is created since the right brake shoe e rotates with the brake drum n until abutting against the anchor block c due to the rotation of the drum brake n in the opposite direction of arrow R as in FIG. 11.

Further, when the parking brake only is applied while stopping on a slope, either one of the brake shoes d or e separates from the anchor block c. If the parking brake is released under this condition when starting, the similar impact noise is created.

OBJECT OF THE INVENTION

This invention was designed to resolve the aforementioned problems, and to that end, an object of the invention is to provide a drum brake device which effectively reduces the impact noise between the brake shoe and anchor block.

More specifically, it is an object of the invention to provide a drum brake device comprising a back plate, two brake shoes set to face each other on top of the back plate, a service brake actuator activated by a service brake mounted on the back plate between one pair of first adjacent ends of the brake shoes, an anchor mounted on the back plate between the other pair of second adjacent ends of the brake shoes, a shoe clearance adjustment device provided adjacent to the service brake actuator and provided between the brake shoes, a parking brake actuator activated by a parking brake provided adjacent to the anchor, and a pivot lever rotatably pivoted at the central region of the brake shoe and one side and other side of which respectively and functionally engages the shoe clearance adjustment device and the parking brake actuator, wherein a shock absorber is placed between the anchor and the other end of the brake shoe facing the anchor.

The invention is a drum brake device as above, wherein the anchor, supporting the other ends of the brake shoes, is a rectangular plate.

The invention further is a drum brake device as above, wherein the shock absorber is detachably installed at the anchor.

The invention still further is a drum brake device as above, wherein the shock absorber is an approximately U-shaped device, having two facing ends which hold the anchor.

The invention still further is a drum brake device as above, wherein the shock absorber is set adjacent to the anchor and is fixed at the back plate by rivets.

The invention still further is a drum brake device as above, wherein the shock absorber is a plate spring.

The invention yet further is a drum brake device as above, wherein grease is applied on the impact surface of the anchor and the shock absorber.

BRIEF DESCRIPTION OF THE DRAWINGS

The above and other object and the attendant advantages of the present invention will become readily apparent by reference to the following detailed description when considered in conjunction with the accompanying drawings wherein.

DETAILED DESCRIPTION OF PREFERRED EMBODIMENTS

One example of this invention is explained next, based on the configurations of FIG. 1–FIG. 6.

Figure 1:
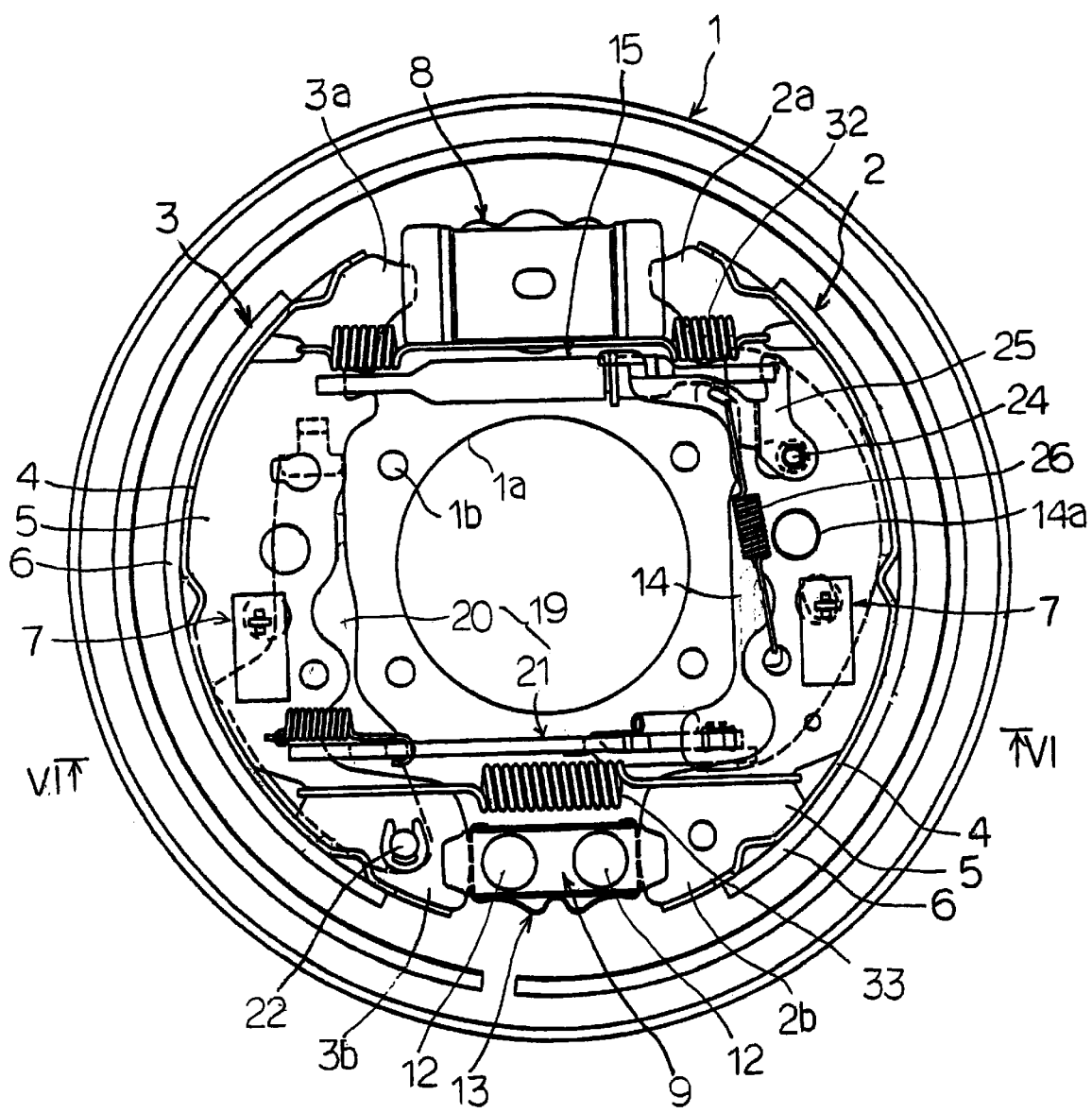
FIG. 1 is a plan view of Embodiment 1 of the drum brake device of this invention.

As shown in FIG. 1, the center hole 1a of the back plate 1 is fitted to the vehicle axle with a gap and is affixed to the stationary part of the vehicle by bolts through a plural number of bolt holes.

With respect to a pair of brake shoes 2, 3, the shoe webs 5, 5 are fixed on the inner surface of the curved shoe rims 4, 4, so as to form a T-shaped section when cross-sectioned. The linings 6, 6 are fixed on the outer surfaces of the shoe rims 4, 4, and the linings 6, 6 frictionally engage with the brake drum, not shown in the diagram, to brake the brake drum. The brake shoes are elastically mounted on the back plate 1 by shoe hold devices 7, 7 comprising the publicly known plate spring and pin.

The service brake actuator 8 is a fluid pressure type or an air pressure type cylinder, which is activated when operating the service brake. The service brake actuator 8 is provided between the adjacent ends 2a and 3a of the brake shoes 2, 3, facing each other, and is mounted on the back plate 1 by bolts, etc.

Figure 2:
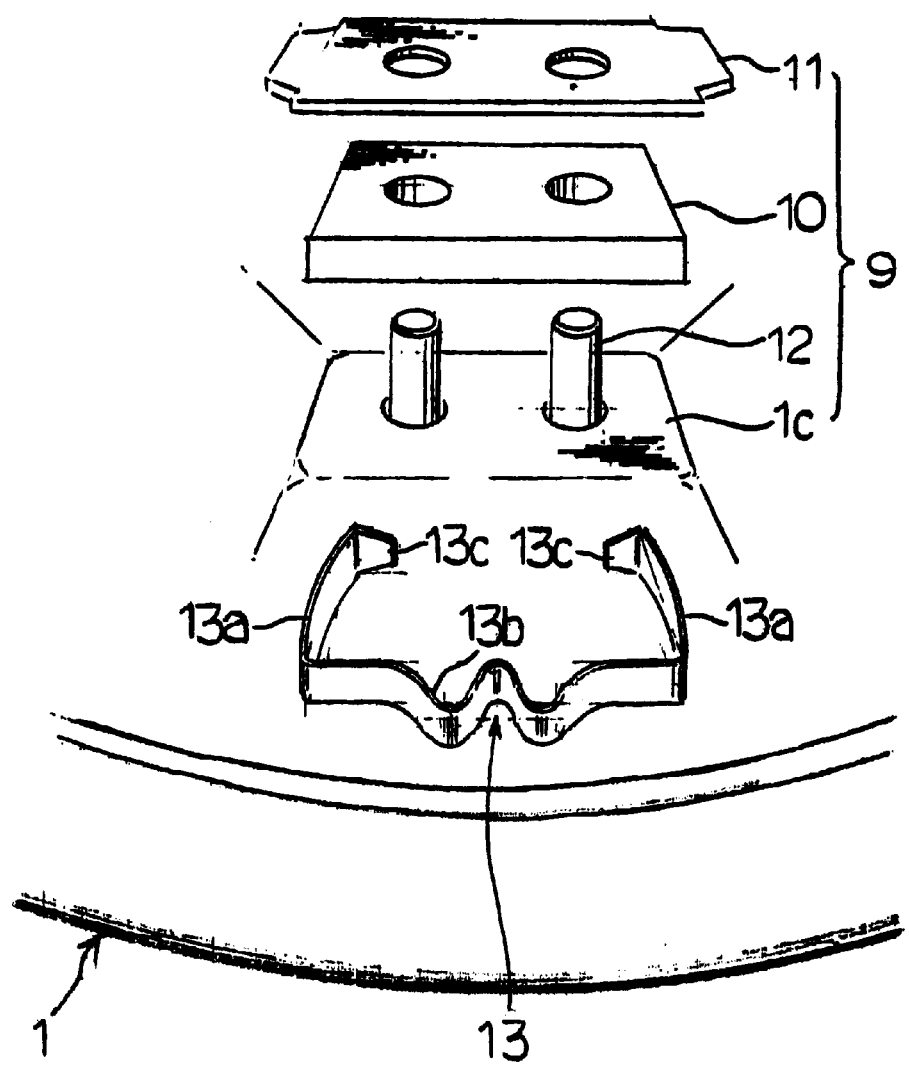
FIG. 2 is an exploded view of the anchor.

As shown in FIG. 1 and FIG. 2, the anchor 9 has a plural number of rivets 12, 12 inserted into a rectangular anchor plate 10 on the protuberance 1c of the back plate 1 and a guiding plate 11 which restricts the brake shoes 2, 3 from raising from the back plate 1. The rectangular anchor plate 10 as shown has a pair of long sides extending horizontally and a pair of short sides extending vertically for illustration purposes. The rivets are tempered to be fixed. The adjacent ends 2b, 3b of the lower part of the brake shoes 2, 3 are respectively supported by the anchor plate 10. The components of the anchor 9 are not specifically required to be the guiding plate 11 and the rivets 12, 12 as shown. The only requirement is that the rectangular anchor plate 10 respectively supports the lower adjacent ends 2b, 3b of the brake shoes 2, 3. The anchor plate 10 may be welded on the back plate 1.

The rectangular anchor plate 10 of the anchor 9 may be a pin type in which an anchor pin is vertically placed. However, using a plate as the anchor plate 10 facilitates the manufacturing process by adopting a press work.

A shock absorber 13 is provided as a cushioning member inserted between the anchor plate 10 of the anchor 9 and the lower adjacent ends 2b, 3b of the brake shoes 2, 3. As shown in FIG. 2, the shock absorber 13 can be formed by bending a plate spring to make a C-shape or approximately U-shape to grab the periphery of the anchor plate 10.

The shock absorber 13 comprises a pair of right and left cushionings 13a, 13a which are slightly curved to bend flexibly. A connecting portion 13b connects between the cushionings 13a, 13a. The hooks 13c, 13c at the ends of the cushionings 13a, 13a and the connection portion 13b facing the hooks grab and engage the long sides of the anchor plate 10.

Figure 3:
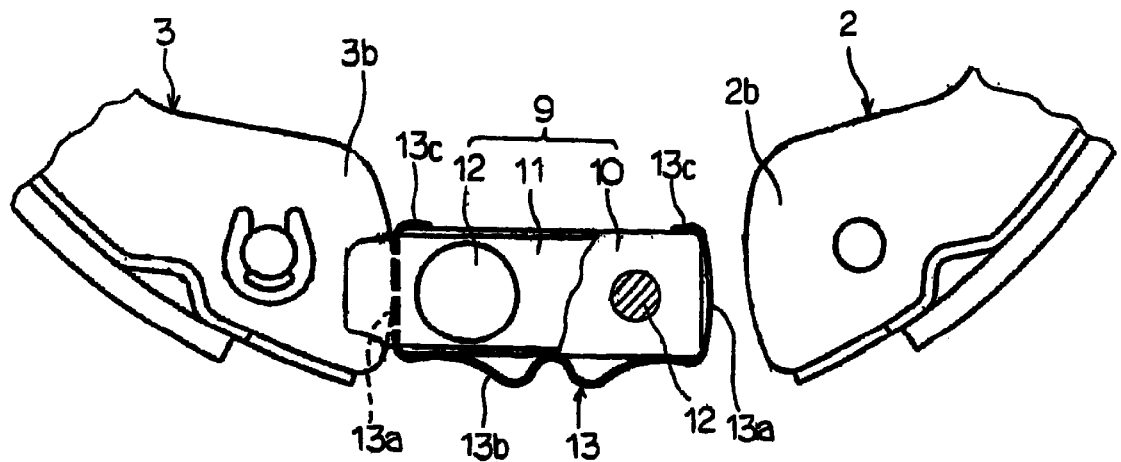
FIG. 3 is a plan view of the anchor when the parking brake is in operation.

Especially, when no external force is applied as in the right side of the FIG. 3, a slight clearance is preferably formed between the side surface of the short sides of the anchor plate 10 and the side surface of the cushioning portion 13a.

The clearance between the surface of the short side of the anchor plate 10 and the cushioning portions 13a, 13a is not limited to the above-explained example. As in FIG. 4, the cushioning portions 13a, 13a may be flat if the respective hook 13c of the shock absorber 13 is curved toward the long side of the anchor plate 10 to form the convex portions 13d, 13d. Corresponding concave portions 10a, 10a are formed in the long sides of the anchor plate 10 to be engaged by the hooks 13c, 13c. When the shock absorber 13 is assembled on the anchor plate 10, the convex portions 13d of the shock absorber 13 are placed in the concave portions 10a of the anchor plate to form a slight clearance between the surfaces of the short sides of the anchor plate 10 and the cushioning portion 13a.

When assembling the shock absorber 13, the hooks 13c, 13c and the cushioning portions 13a, 13a are stretched to be assembled from the long sides of the anchor 9 affixed on the back plate 1.

In this embodiment, the shock absorber 13 is installed from outside of the brake device; however, it may be done from the center of the brake device.

A material have more corrosion resistance, such as stainless steel, may be used as a shock absorber 13. The hooks 13c, 13c may be bent later by placing the steel plate along the respective long side of the anchor plate 10 and then bending it.

If the parking brake is released on a level or slope, or if the parking brake is applied after the service brake is applied to stop the vehicle on a slope, then the service brake is released while the vehicle is stopping, for instance as in FIG. 3, the brake shoe 2 separated from the anchor 9 rotates by the return spring force or rotates with the brake drum (not shown in the diagram) so that the lower end 2b may return to contact the anchor 9.

As already explained, the conventional device without the shock absorber 13 creates an impact noise.

When compared to the conventional device, in this invention, the cushioning portion 13a of the shock absorber 13 installed on the anchor 9, with its spring force, absorbs the impact force on the lower end 2b of the brake shoe 2, which remarkably reduces the impact noise. Further, the shock absorber 13 of the invention also reduces the impact noise between the lower end 3b of the brake shoe 3 and the anchor 9.

The drum brake device is equipped with a pivot lever 14 in order to maintain the operation of the service brake and parking brake when applying the service brake and parking brake at the same time.

The pivot lever 14 is provided on the shoe web 5 of the brake shoe 2. A protuberance 14a formed at the central region of the pivot lever 14 by pressing that portion is mounted and rotatably pivoted in a hole in the shoe web 5. A pin may be used as the pivot instead of the above-mentioned protuberance 14a and hole.

Adjacent to the service brake actuator 8, a shoe clearance adjustment device 15 bridges between the brake shoes 2 and 3.

Figure 5:
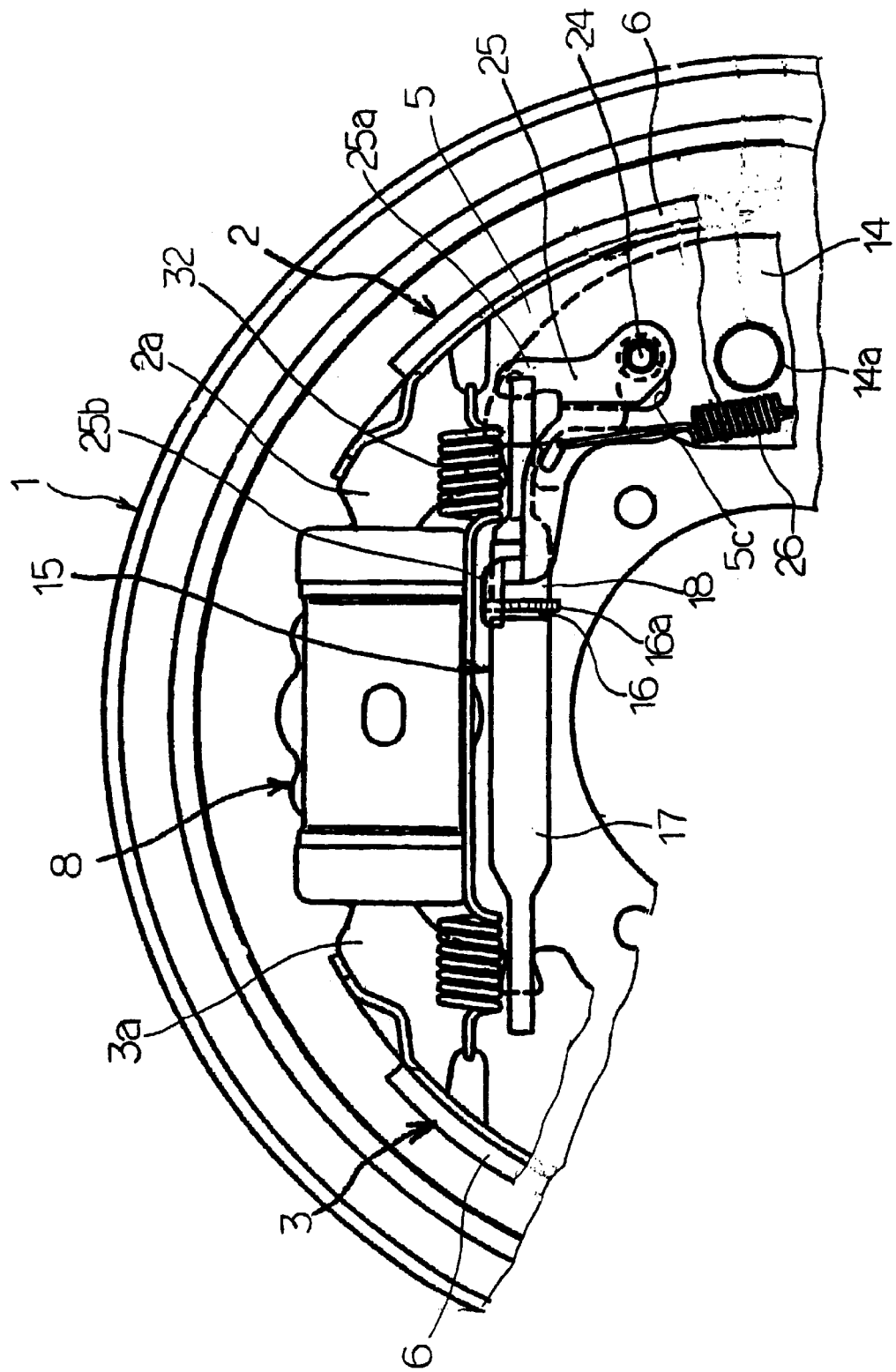
FIG. 5 is a plan view of the service brake actuator.

As is explained with reference to FIG. 5, the shoe clearance adjustment device 15 can be a publicly known screw type adjustment device for adjusting the clearance between the brake drum (not shown in the diagram) and the brake shoes 2, 3, which comprises a bolt 16 with a toothed adjuster 16a, a tube 17 into which one end of the bolt 16 is screwed, and a socket 18 rotatably fitting with the other end of the bolt 16. Inserting a device such as a screwdriver through a hole, not shown in the diagram, formed in the back plate 1 or in the brake drum, the whole length of the shoe clearance adjustment device 15 may be manually adjusted by screwing the bolt 16 with the toothed adjuster 16a to screw the part of the bolt 16 out from or into the tube 17.

One end of each of the above-described tube 17 and the socket 18 are pressed to form plate-shaped ends having a notched groove therein. The bottom of the notched groove at the left end of the tube 17 abuts against the shoe web 5 of the brake shoe 3 in a notch provided therein. The bottom of the notched groove of the right end of the socket 18 abuts against the shoe web 5 of the brake shoe 2.

A slight clearance exists between the bottom of the notched groove of the pivot lever 14 and the bottom of the notched groove of the socket 18 in consideration of manufacturing tolerance. The pivot lever 14 is able to abut against the notched groove of the socket 18 when the pivot lever 14 rotates counterclockwise with the point of abutment with the protuberance 14a as the fulcrum.

An incremental type automatic shoe clearance adjustment device, activating when the service brake in operation, is explained with reference to FIG. 5. A pin 24 fixed at one side of the pivot lever 14 is vertically set to freely protrude through a slot 5c in the shoe web 5 of one brake shoe 2. The central region of an adjustment lever 25 is rotatably supported on the pin 24 as the fulcrum. An arm 25a of the adjustment lever 25 abuts against the stepped surface of the socket 18, and another arm 25b engages with the toothed adjuster 16a of the bolt 16. An adjustment spring 26 extends between the another arm 25b and the shoe web 5 and provides the adjustment lever 25 with the counterclockwise spring force with the pin 24 as the fulcrum.

In the configuration described above, when both brake shoes 2, 3 open with the point of the abutment on the anchor 9 as the fulcrum in service brake operation, the shoe clearance adjustment device 15 follows the brake shoe 3 because of the spring force of the adjustment spring 26. The pivot lever 14 follows the other brake shoe 2. At this time, however, the pivot lever 14 is rotated clockwise with the protuberance 14a as the fulcrum as in FIG. 5. Accordingly, the adjustment lever 25 rotates counterclockwise to the amount that the pin 24 rotates plus the amount that the shoe clearance adjustment device 15 follows the brake shoe 3.

When the linings 6, 6 are worn and the amount of rotation of the arm 25b of the adjustment lever 25 goes beyond one pitch of the teeth of the toothed adjuster 16a, the bolt 16 is screwed to be exposed out of the tube 17 and the clearance between the brake drum (not shown in the diagram) and the linings 6, 6 is automatically adjusted to be maintained a certain distance.

When the parking brake is in operation, the shoe clearance adjustment device 15, the pivot lever 14, the adjustment lever 25, etc. follow together to the amount of brake shoe 3 opening, which allows no effect on the automatic adjustment operation.

As shown in FIG. 1, the parking brake actuator 19 activating when the parking brake in operation is provided adjacent to the anchor 9. The parking brake actuator 19 comprises a forward-pull type brake lever 20 and a strut 21, etc.

The brake lever 20 is mounted under the shoe web 5 of the brake shoe 3. The basal part is pivotably supported by a pin 22 at the other end 3b of the brake shoe 3. A notched groove is formed at the folded portion of the free end of the brake lever 20. A parking brake cable is hooked to that groove in a conventional manner.

Figure 6:
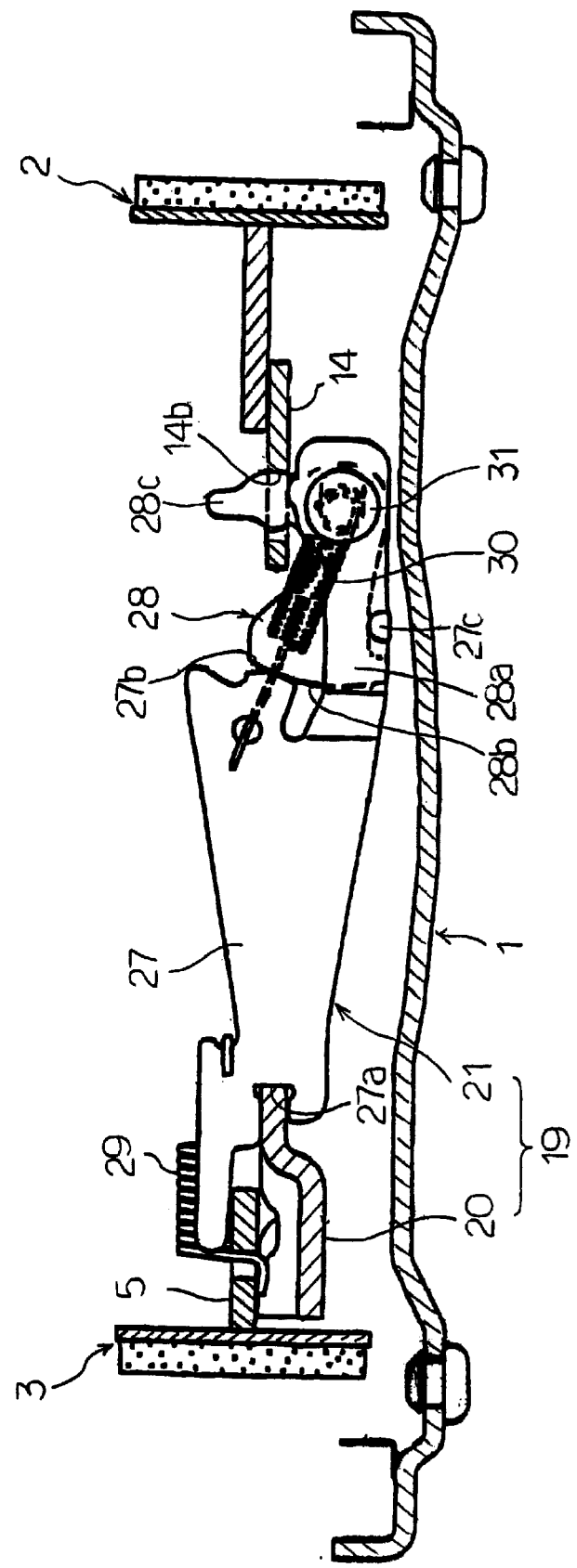
FIG. 6 is a cross section view taken along the line VI—VI in FIG. 1.

As shown in FIG. 6, the strut 21 having an automatic lever stroke adjustment function comprises a plate-shaped adjustment strut 27, a bell crank lever 28, and springs 29, 30.

The bottom of a notched groove 27a of the adjustment strut 27 abuts against the inner surface of the brake lever 20. The spring 29 stretched between the shoe web 5 of the brake shoe 3 and the adjustment strut 27 maintains the abutment of the adjustment strut 27 and the brake lever 20.

At the right side of the adjustment strut 27, the central portion of the bell crank lever 28 is rotatable with a pin 31 as the fulcrum and is slidable in the longitudinal direction of the adjustment strut 27. Teeth 28b formed with small pitches are provided on the outer circumference of the arm 28a and have a sector form. These teeth 28b engage teeth 27b formed with small pitches provided at the central region of the adjustment strut 27. The spring 30 stretched between the adjustment strut 27 and the pin 31 maintains the engagement between the teeth 27b and 28b. A protuberance 27c is formed on the adjustment strut 27, which regulates and limits the counterclockwise rotation of the bell crank lever 28.

The arm 28c of the bell crank lever 28 is freely inserted through the rectangular hole 14b formed at the other side of the pivot lever 14. Then, the operational force of the brake lever 20 is transferable via the strut 21.

In addition, this invention does not require a lever stroke automatic adjustment device to automatically adjust the clearance between the brake lever 20 and the pivot lever 14 which increases as the lining 6 of the brake shoe 2 wears out.

As shown in FIG. 1, return springs 32, 33, extend between the upper ends of the brake shoes 2, 3 and between the lower ends of the brake shoes 2, 3, which return the brake shoes 2, 3 back to the original positions when the brake is released.

The moment of the lower return spring 33 side is set to be higher than the moment of the upper return spring 32 side so that the lower end 2b of the brake shoe 2 may not separate from the anchor 9 when the brake is not in operation, even if the brake lever 20 is set to be slightly pulled.

Setting the moment in the above way prevents the dragging of the brake shoe and at the same time certainly and effectively reduces the impact noise created when just releasing the parking brake on a level road.

The operation of the drum brake device is explained next.

In service brake operation, as the pressure is applied to the service brake actuator 8, both brake shoes 2, 3 are spread open with the point of abutment with the anchor 9 as the fulcrum. The linings 6, 6 frictionally engage with rotating brake drum, not shown in the diagram, thereby braking the brake drum. At this time, one of the brake shoe 2 or 3 functions as self-servo, and the other of the brake shoe 3 or 2 does function as non-servo, thereby having the brake device functioning as a LT type brake.

In FIG. 1, in parking brake operation, the brake lever 20 is pulled to the right by the parking brake cable, not shown in the diagram. Then, the brake lever 20 rotates clockwise with the pin 22 as the fulcrum. The rotating force of the brake lever 20 is transmitted to the strut 21, the pivot lever 14, and the shoe clearance adjustment device 15 in that order. Accordingly, the other brake shoe 3 opens with the point of abutment with the anchor 9 as the fulcrum and frictionally engages with the brake drum, not shown in the diagram. Then, the pivot lever 14 rotates counterclockwise with the point of abutment with the shoe clearance adjustment device 15 as the fulcrum, and the operating force is transmitted to the brake shoe 2 via the protuberance 14a of the pivot lever 14. Therefore, the brake shoe 2 opens with the point of abutment with the anchor 9 as the fulcrum to frictionally engage with the brake drum. Also, the reaction force affects the lower end of the other brake shoe 3 via the pin 22.

At this point, when the vehicle is stopping on an incline or decline, as the counterclockwise rotating force is applied to the brake drum, the frictional force of the other brake shoe 3 is transmitted to one brake shoe 2 as an opening force via the shoe clearance adjustment device 15.

Also, as applying the clockwise rotating force, the frictional force of one brake shoe 2 is transmitted to the other brake shoe 3 via the shoe clearance adjustment device 15. Accordingly, when the parking brake is in operation, both brake shoes 2, 3 have the self-servo effects, thereby having the brake device functioning as a DS type brake.

Embodiment 2 of the Invention

In the following other embodiments, the same reference signs are used for the parts identical to the parts of the above-described embodiment, and the explanation of these are omitted here.

Figure 7:
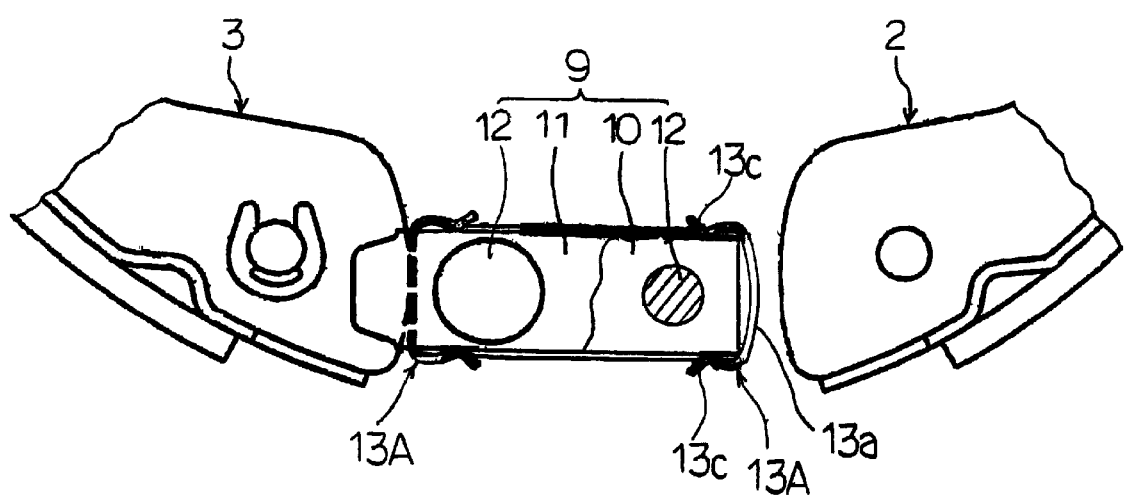
FIG. 7 explains Embodiment 2 and is a plan view of the anchor when the parking brake is in operation.

FIG. 7 illustrates an embodiment in which individual shock absorbers 13A, 13A are flexibly provided on the short sides of the anchor plate 10 respectively.

The respective shock absorber 13A is an approximately U-shaped device in which two ends of the cushioning portions 13a are bent at almost a right angle to form the hooks 13c, 13c. The pair of the hooks 13c, 13c facing each other grab the long sides of the anchor plate 10 by their inherent flexibility.

The cushioning portions 13a of the shock absorber 13A are preferably designed to maintain a slight clearance between the portion 13a and the surface of the short side of the anchor plate 10 when no external force is applied. However, the clearance is not an absolutely necessary structural factor of the invention.

In this embodiment, the shock absorbers 13A, 13A are easily assembled by fitting them on the anchor plate 10 of the anchor 9. The hooks 13c, 13c only slightly open, which prevents the off settling of the cushioning portions when inserting the shock absorbers 13A, 13A.

This invention is very economical in that such small pieces are easily replaced when a problem such as wearing out occurs to the shock absorbers 13A, 13A.

Figure 4:
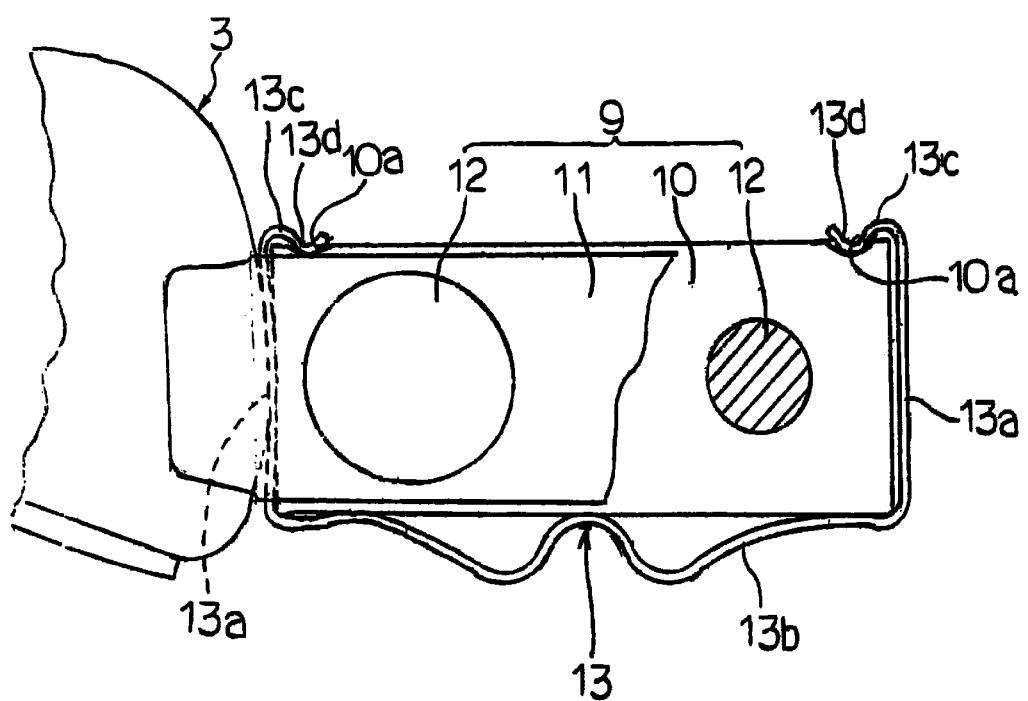
FIG. 4 is a plan view of the anchor relating to another holding structure of the shock absorber.

The engagement structure of the anchor plate 10 and the shock absorber of FIG. 4 may of course be employed here.

Embodiment 3 of the Invention

Figure 8:
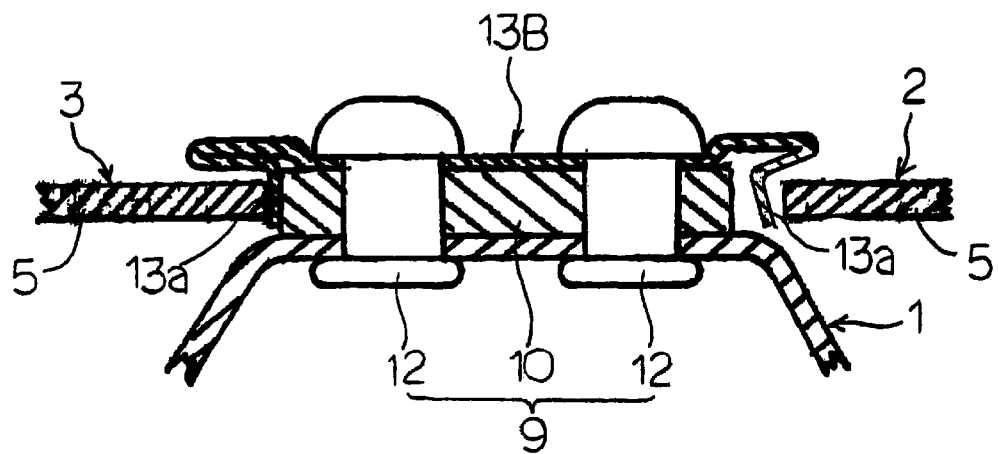
FIG. 8 explains Embodiment 3 and is a plan view of the anchor when the parking brake is in operation.

FIG. 8 illustrates another embodiment in which a shock absorber 13B is superposed directly on the anchor plate 10 on the surface that is opposite to the back plate 1. The shock absorber 13B is fixed to the anchor plate 10 and the back plate 1 by the rivets 12, 12.

Two ends of the plate springs of the shock absorber 13B of this embodiment are folded to extend over the shoe webs 5, 5. The folded ends are bent in a right angle to form the cushioning portions 13a, 13a. In this embodiment, the folded portions of the shock absorber 13B folded over the shoe webs 5, 5 restrict the raising of the brake shoes 2, 3. Thus, the guiding plate 11 is not required here.

Embodiment 4 of the Invention

Figure 9:
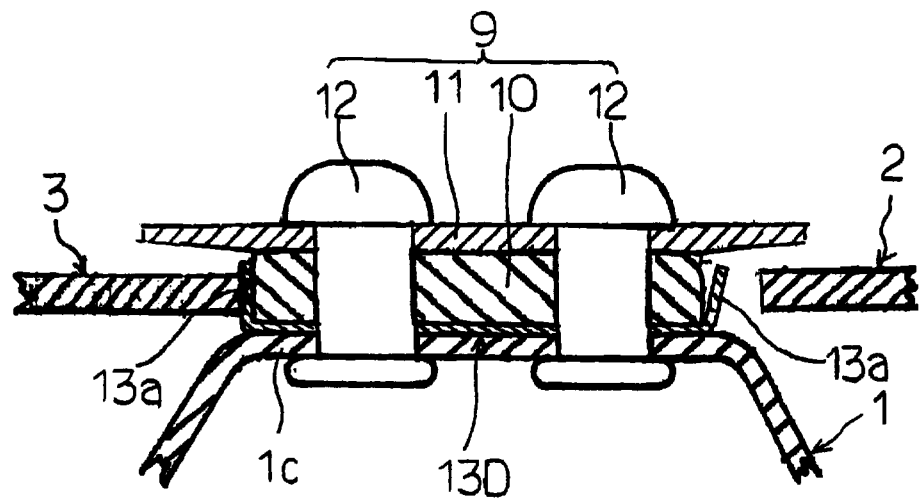
FIG. 9 explains Embodiment 4 and is a plan view of the anchor when the parking brake is in operation.
Figure 10:
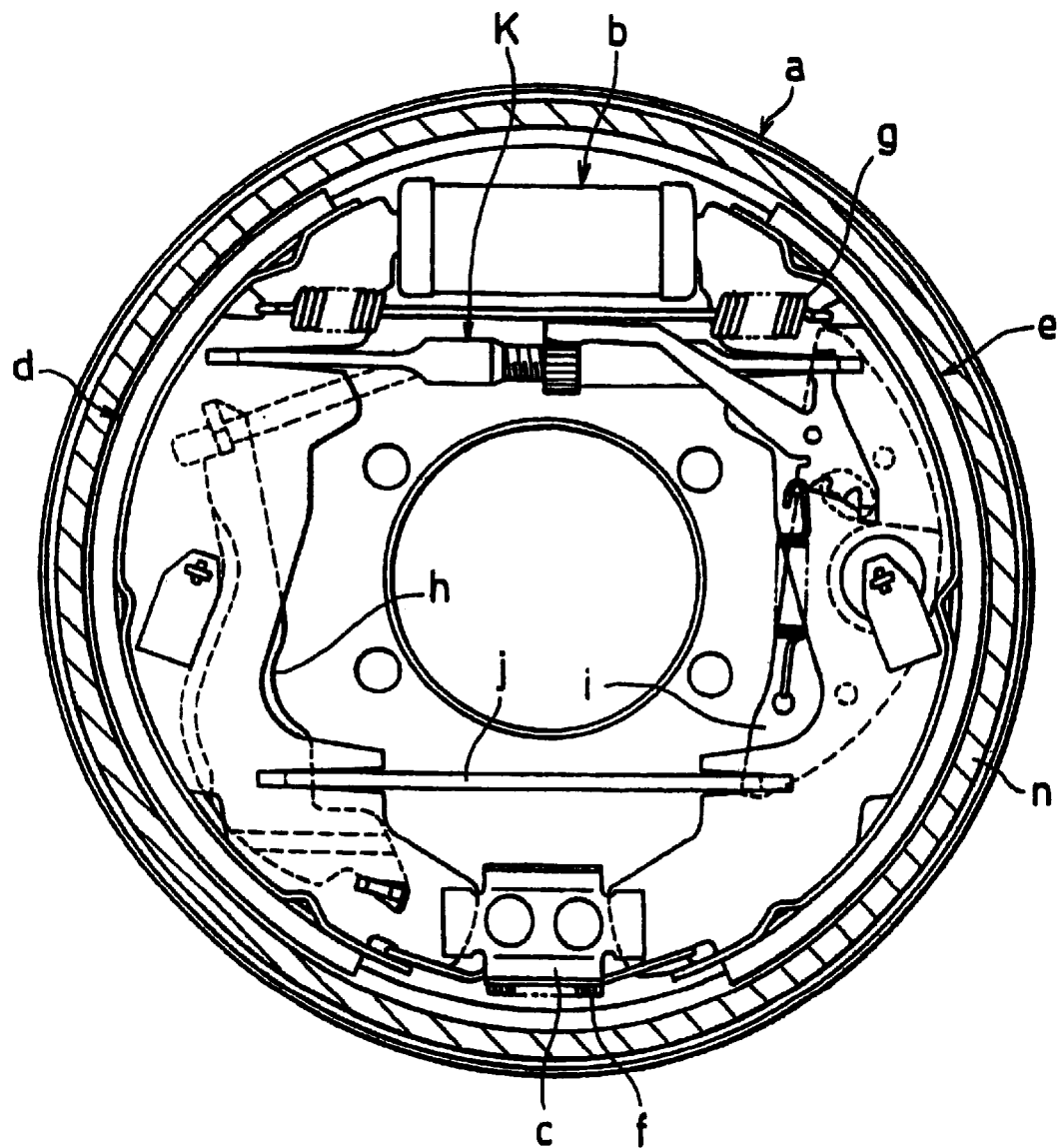
FIG. 10 is a plan view of the drum brake device on which this invention is based.
Figure 11:
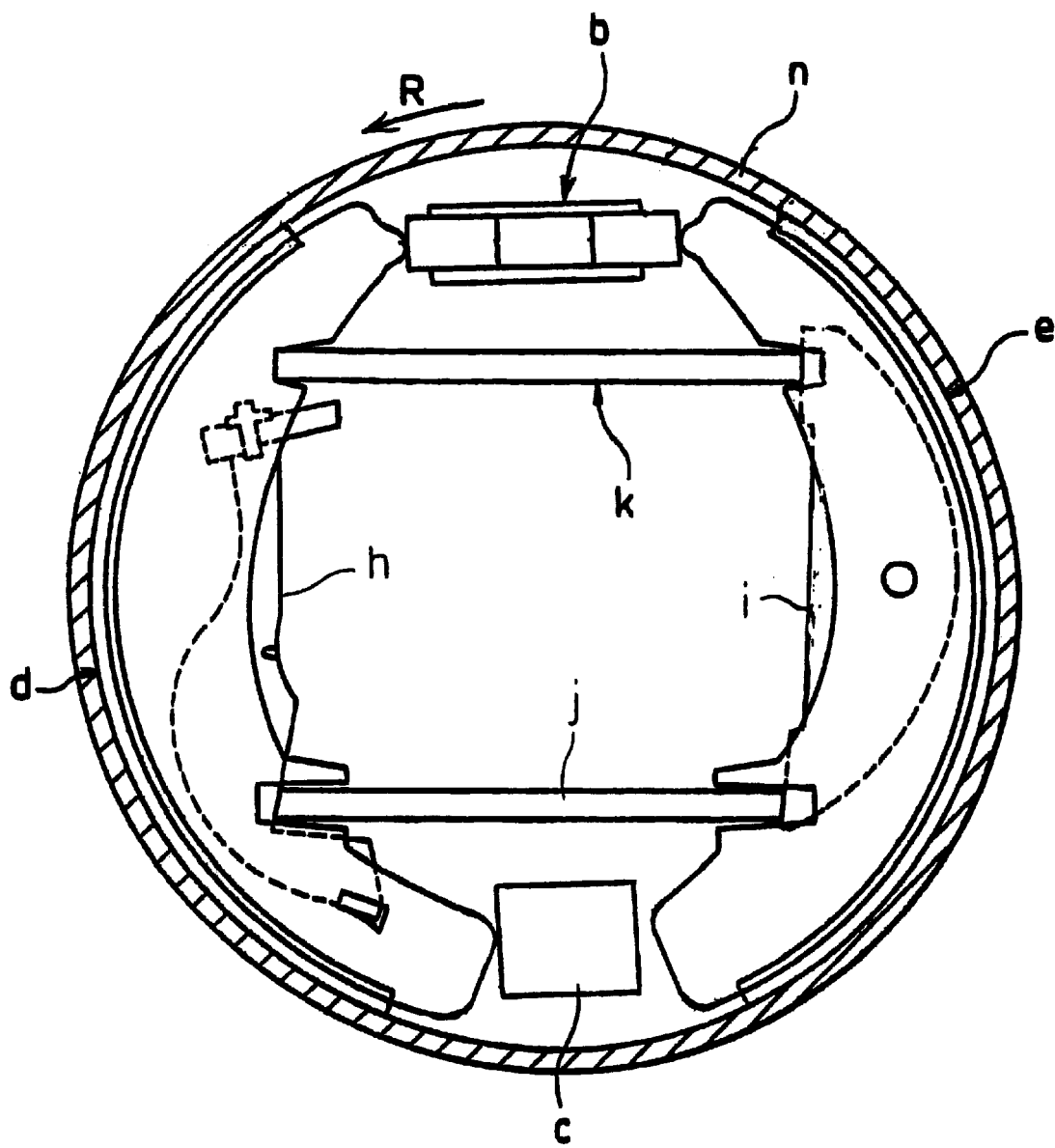
FIG. 11 is a model view of the drum brake device as explained in FIG. 10 which illustrating the operation when the parking brake is released.

FIG. 9 illustrates a shock absorber 13D arranged between the anchor plate 10 of the anchor 9 and the back plate 1. The shock absorber 13D is fixed to the back plate 1 by the rivets 12, 12.

Two ends of the shock absorber 13D of this embodiment are bent at an obtuse but approximately right angle to form the cushioning portions 13a, 13a.

In this embodiment, the protuberance 1c of the back plate 1 may be lower, which facilitates drawing by pressing and lowers the expense of making the back plate.

Further, in the above-mentioned embodiments 2–4, grease may be applied between the anchor plate 10 and the shock absorbers 13A, 13B, 13D as in Embodiment 1.

Embodiment 5 of the Invention

The above-explained Embodiment 1 illustrates the drum brake device equipped with an incremental type shoe clearance adjustment device 15 which automatically adjusts the clearance between the lining of the brake shoe and the brake drum. However, the automatic adjustment device is not limited to this type.

Further, the automatic adjustment device may be a manual adjustment device without an automatic function in some cases.

Embodiment 6 of the Invention

A cross-pull type parking brake may be used in the drum brake device.

Embodiment 7 of the Invention

The above-explained Embodiment 1 illustrates the drum brake device, in which the certain relation of the moment between the return spring 32 and 33 affecting the brake shoe 2 is set. However, the moment relation is not limited to the above-described example. For the purposes of this invention, the device is only required to function as a LT type brake when the service brake is in operation and to function as a DS type brake when the parking brake is in operation.

This invention has the following advantages:

From the above-described system, this invention has the following effects:

The shock absorber is provided between the anchor and the end of the brake shoe facing the anchor, which allows to create an indirect contact between the brake shoe and the anchor. This effectively reduces the impact noise and eliminates uncomfortable and unsecure feeling of the driver.

Applying grease between the anchor and the shock absorber further reduces the impact noise.

The shock absorber, which is detachable from the anchor, facilitates the assembly and disassembly of the shock absorber. Further, the shock absorber may be set without special processing.

Indirect contact between the brake shoe and the anchor via the shock absorber helps to prevent wearing out and settling of the anchor.

Using the harder material for the shock absorber helps to prevent wearing out and settling of the parts supporting the brake shoe and restricts the sliding resistance of the brake shoe for a long time.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What I claim is:

1. A drum brake device comprising:

a back plate, two brake shoes set to face each other on top of said back plate, a service brake actuator activated by a service brake mounted on said back plate between a pair of first adjacent ends of said brake shoes, an anchor mounted on said back plate between a pair of second adjacent ends of said brake shoes, a shoe clearance adjustment device provided adjacent to said service brake actuator and provided between said brake shoes, a parking brake actuator comprising a parking brake lever and a strut adjacent to said anchor, a pivot lever rotatably pivoted longitudinally in the intermediate portion of one of said brake shoes and having one side and another side which respectively and functionally engage said shoe clearance adjustment device and said parking brake actuator, and a shock absorber placed on an outer periphery of said anchor comprises a cushioning portion located between said anchor and a pair of second ends of said brake shoes facing said anchor, a hooking portion clamping said anchor, and an elastic portion connecting said cushioning portion and said hooking portion.

2. A drum brake device as claimed in claim 1, wherein said anchor, supporting the other ends of the brake shoes, is a rectangular plate.

3. A drum brake device as claimed in claim 2, wherein said shock absorber is detachably installed at said anchor.

4. A drum brake device as claimed in claim 3, wherein said shock absorber is a plate spring.

5. A drum brake device as claimed in claim 3, wherein grease is applied on an impact surface of said anchor and said shock absorber.

6. A drum brake device as claimed in claim 2, wherein said shock absorber is an approximately U-shaped device having two facing ends, the facing two ends holding said anchor.

7. A drum brake device as claimed in claim 6, wherein grease is applied on an impact surface of said anchor and said shock absorber.

8. A drum brake device as claimed in claim 2, wherein said shock absorber is a plate spring.

9. A drum brake device as claimed in claim 2, wherein grease is applied on an impact surface of said anchor and said shock absorber.

10. A drum brake device as claimed in claim 1, wherein said shock absorber is detachably installed at said anchor.

11. A drum brake device as claimed in claim 10, wherein said shock absorber is an approximately U-shaped device having two facing ends, the facing two ends holding said anchor.

12. A drum brake device as claimed in claim 10, wherein said shock absorber is a plate spring.

13. A drum brake device as claimed in claim 10, wherein grease is applied on an impact surface of said anchor and said shock absorber.

14. A drum brake device as claimed in claim 1, wherein said shock absorber is an approximately U-shaped device having two facing ends, the facing two ends holding said anchor.

15. A drum brake device as claimed in claim 14, wherein said shock absorber is a plate spring.

16. A drum brake device as claimed in claim 14, wherein grease is applied on an impact surface of said anchor and said shock absorber.

17. A drum brake device as claimed in claim 1, wherein said shock absorber is a plate spring.

18. A drum brake device as claimed in claim 1, wherein grease is applied on an impact surface of said anchor and said shock absorber.

* * * * *